Dec. 11, 1934.   L. E. JONES   1,983,906
FRUIT WASHING MACHINE
Filed Aug. 18, 1923   2 Sheets-Sheet 2
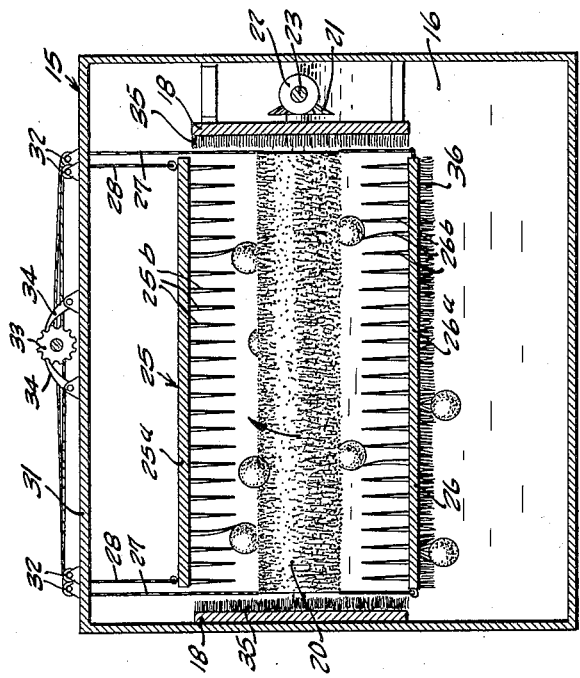
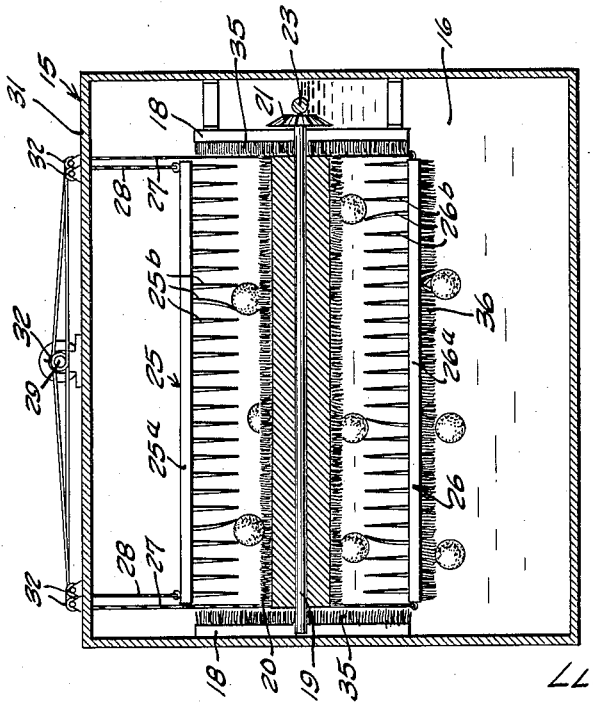
INVENTOR
LLOYD E. JONES
BY Munn & Co.
ATTORNEYS Patented Dec. 11, 1934

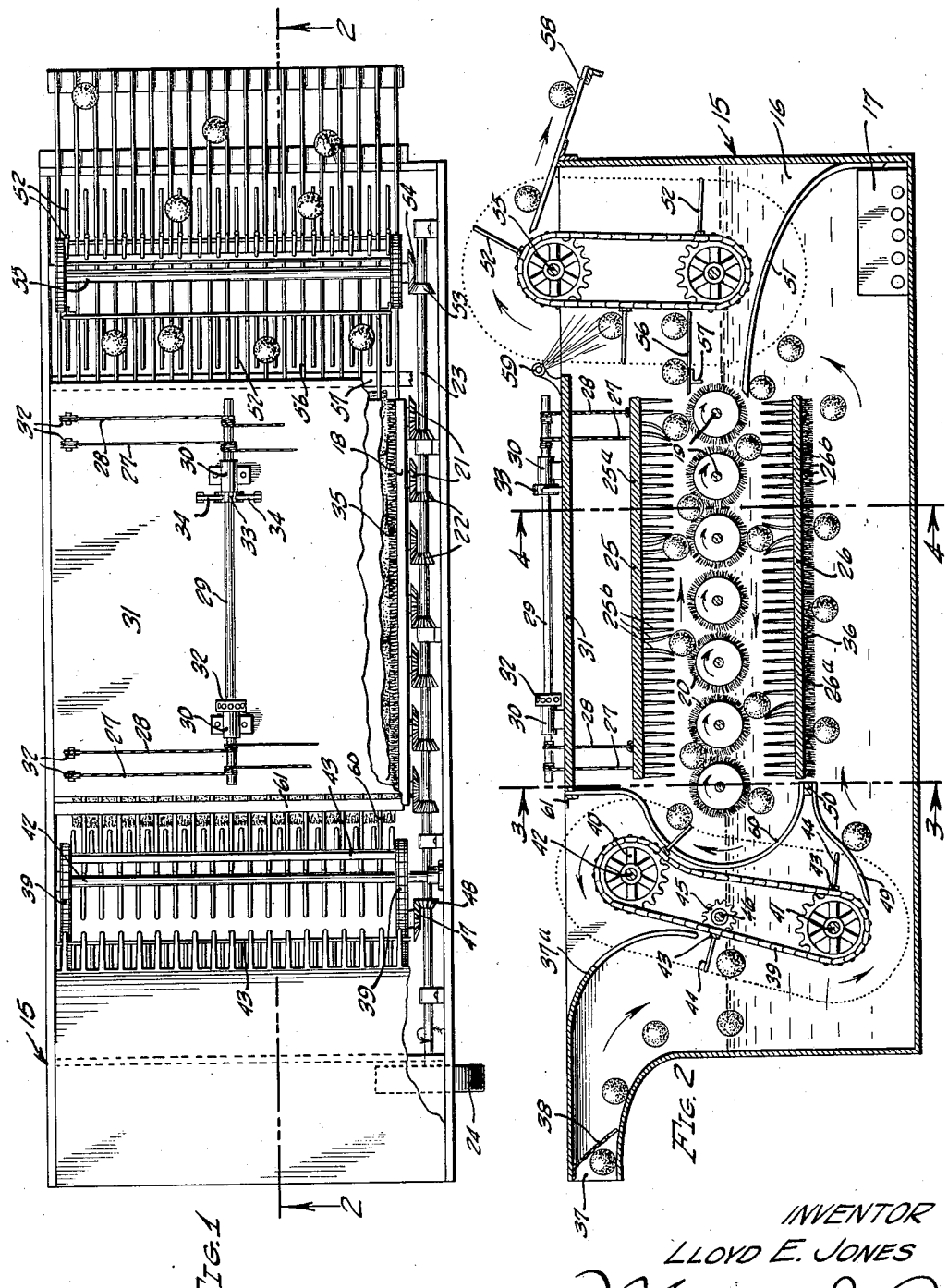

1,983,906

UNITED STATES PATENT OFFICE 1,983,906

FRUIT WASHING MACHINE

Lloyd Everett Jones, Santa Monica, Calif., assignor to Food Machinery Corporation, San Jose, Calif., a corporation of Delaware Application August 18, 1928, Serial No. 300,525

25 Claims. (Cl. 146—202)

My invention relates to machines for washing fruit, and it has for a purpose the provision of a machine which is characterized by its ability to wash and, to a certain degree, polish pieces of fruit more thoroughly and rapidly, and without injury to the fruit, than is possible in like machines heretofore proposed.

I will describe only one form of fruit washing machine embodying my invention and will then point out the novel features in claims.

In the accompanying drawings:

Figure 1 is a view showing in plan, with portions thereof broken away, one form of fruit washing machine embodying my invention;

Fig. 2 is a vertical longitudinal sectional view taken on the line 2—2 of Fig. 1, and illustrating the machine in the process of operation;

Figs. 3 and 4 are enlarged vertical sectional views taken on the lines 3—3 and 4—4, respectively, of Fig. 2.

My invention in its present embodiment comprises an elongated tank or receptacle 15, in which a suitable washing fluid, indicated at 16, is adapted to be contained, such fluid being preferably water containing soap in the required quantity to produce a liquid which is capable of effectively cleaning the surface of the fruit. As is customary in washers of this kind, the washing fluid is heated, and I have, therefore, shown in Fig. 2 a conventional type of heater 17 in order to maintain the fluid at such a temperature that it will operate effectively to wash the fruit.

Substantially centrally within the tank is arranged a frame 18 in which is journaled a plurality of shafts 19 having fixed thereto rotary brushes 20. The brushes are arranged transversely of the tank and in side-by-side relation, one end of the shafts being extended beyond the frame 18 and provided with mitre gears 21 which constantly mesh with similar gears 22 fixed to a shaft 23 that extends longitudinally of the tank, as clearly shown in Fig. 1, with one end projecting beyond the tank where it is provided with a pulley 24 to which power from any suitable source (not shown) is adapted to be applied for driving the shaft and through the medium of the gears 21 and 22 rotating the brushes 20, all in a clockwise direction as when viewed in Fig. 2. Above and below the rotary brushes 20 devices 25 and 26 are arranged to define upper and lower passages through which pieces of fruit are adapted to travel at opposite sides of the brushes.

These devices function to yieldably urge the pieces of fruit into contact with the brushes 20 and throughout their length of travel through the passages in order that the brushes may function properly to wash and polish the fruit.

The upper device 25 comprises, in the present instance, a board or base 25ª of an area corresponding substantially to that of the several rotary brushes. This board 25ª is provided with a multiplicity of fingers 25ᵇ, which depend from the lower side of the board so as to be presented to the fruit as it traverses the upper side of the brushes. These fingers 25ᵇ are flexible in order that they may yield to the travel of fruit through the upper passage, but in a manner to maintain the pieces of fruit in contact with the surfaces of the brushes and to prevent upward projection of the fruit as a natural result of the rotating action of the brushes. These fingers may be formed of rubber or any other suitable material which will flex under the movement of the fruit but return to perpendicular position when not influenced by the fruit.

The lower device 26 is constructed in a similar manner with its fingers 26ᵇ projecting upwardly instead of downwardly in order that they may function in the same manner in connection with the pieces of fruit as they pass through the lower passage and across the rotary brushes. It will, of course, be understood that the fingers 26ᵇ operate to prevent downward projection of the pieces of fruit in order that they may be maintained in proper brushing contact with the brushes 20, but their primary purpose is to maintain the pieces of fruit against the brushes with sufficient pressure to insure thorough washing of their surfaces.

The fingers 25ᵇ also perform a similar function and to vary the urging action of the fingers in respect to the fruit, both devices are mounted for adjustment vertically to alter their spaced relation with respect to the brushes 20. Any suitable mechanism may be provided for the purpose, and in the present instance I have shown the devices suspended from cables or cords, cables 27 being connected to the board 26ª of the lower device, and cables 28 connected to the board 25ª of the upper device. The cables 27 and 28 are trained oppositely about a shaft 29 journaled in bearings 30 secured to a bridge member 31 which extends transversely across the top of the tank. As shown in Fig. 1, the cables 27 and 28 are extended around suitable pulleys 32 and then downwardly through the bridge member where they are connected to the respective boards 25ª and 26ª. Rotation of the shaft 29 may be effected by inserting a suitable instrument in any one of a plurality of openings formed in a head 32 fixed to the shaft, and it will be understood that by reason of the manner in which the cables are wound on the shaft that rotation of the latter in one direction or the other will operate the cables to lower the upper device and raise the lower device or vice versa, depending upon the direction of rotation of the shaft. The shaft can be secured against rotation and the devices thus maintained in adjusted position by the provision of a ratchet wheel 33 fixed to the shaft 29 and engaged by either of a pair of pivoted pawls 34.

It will be clear that to release the shaft incident to rotation thereof in one direction or the other one pawl or the other must be thrown to a released position and after the desired rotation has been effected the pawl can be returned to latching position thereby securing the shaft against further rotation. In this manner the two devices can be adjusted and maintained in adjusted position to define passages of predetermined widths to accommodate fruit of various sizes and to cause the fingers 25$^b$ and 26$^b$ to force the pieces of fruit into contact with the brushes with a predetermined pressure to secure the required cleaning action for any particular condition of the surface of the fruit.

As clearly illustrated in Figs. 1, 3, and 4, the confronting sides of the frame 18 are formed with bristled surfaces to form side brushes 35, which define the side walls of the upper and lower passages and hence are adapted to be engaged by the pieces of fruit as they traverse the passages thereby coacting with the rotary brushes in effecting cleaning and polishing of the pieces of fruit. To effect a preliminary cleaning or washing of the fruit prior to its entrance into the lower passage, I provide a brushing surface 36 on the under side of the board 26$^a$. This board defines the upper wall of what I term a soaking compartment through which the pieces of fruit travel prior to entering the lower passage. By reason of the buoyancy of the pieces of fruit when submerged in the cleaning fluid of the soaking compartment, these pieces of fruit naturally rise into contact with the brushing surface 36 wherefore under their forward movement they are subjected to a preliminary washing.

The fruit is introduced into the tank through an entrance chute 37 at one end thereof, a flexible flap or door 38 formed of canvas or other suitable material being mounted in the entrance chute to normally close the latter so as to prevent the escape of heat from the tank. It will be understood that as the fruit is introduced into the chute in its forward rolling movement, it will lift the flap and thus permit the fruit to be deposited into the washing fluid. Following introduction of the fruit, it is submerged in the washing fluid by means of a conveyor which, in the present instance, comprises a pair of endless chains 39 trained about sprocket wheels 40 fixed to shafts 41 and 42 journaled in the tank. Connecting the chains 39 at intervals along the length thereof are bars 43 from each of which project a multiplicity of arms 44 regularly spaced and of such length as to engage and lower or elevate pieces of fruit of various sizes. The conveyor is driven by means of a gear 45 fixed to a shaft 46 provided at its outer end with a mitre gear 47 which constantly meshes with a similar gear 48 fixed to the main driving shaft 23. It will be understood that the gear 45 meshes with one of the chains 39 and under rotative movement of the former the entire conveyor is actuated.

In the operation of the conveyor, the descending arms 44 first pass through the slotted ends of a partition 37$^a$ which is a continuation of the top wall of the chute 37 and is curved to guide the pieces of fruit downwardly into the liquid as they leave the chute. Upon leaving the partition 37$^a$, the arms 44 engage the floating fruit and submerge it into the liquid and to a point adjacent the bottom of the tank. The fruit is directed from the conveyor of the soaking compartment by means of a guide member 49 made up of a plurality of arms spaced to permit movement of the arms 44 thereof but to prevent passage of the fruit therethrough.

These arms are secured to a cross-bar 50 suitably mounted within the tank. A similar guide member 51 is secured within the forward end of the tank and it is so positioned as to guide the pieces of fruit as they leave the soaking compartment upwardly into the lower passage between the rotary brushes and the lower device 26. The guide member 51 is likewise formed of a plurality of arms spaced to permit the passage therebetween of arms 52 of an elevating conveyor for discharging the fruit after washing and polishing to a point exteriorly of the tank. This conveyor is similar in construction to the first conveyor but is driven from the driving shaft 23 by the provision of mitre gears 53 and 54 fixed to the shafts 23 and 55, respectively. The direction of rotation of the conveyor is indicated by the arrow in Fig. 2, and, consequently, it will be seen that the arms 52 at one side of the conveyor move upwardly between the arms of a platform 56 secured to an angle bar 57. This platform is positioned to receive fruit discharged from the upper passage of the machine so that the ascending arms 52 will elevate the fruit and finally discharge it onto a delivery board 58, which may be constructed of a plurality of rods, as illustrated in Fig. 1, in order to individually guide the pieces of fruit as they descend the board and permit the drainage of water from the surfaces thereof. To rinse the fruit as it leaves the machine in order that adhering suds may be removed therefrom, I provide a spray pipe 59, preferably supported on the bridge member 31 and positioned to discharge a spray of water downwardly on the fruit as it is elevated by the conveyor so that when the fruit is finally discharged onto the delivery board it is free of all suds.

As will be clear from Fig. 2, the fruit after traversing the passage between the brushes 20 and the lower device 26, must be elevated and dumped from the requisite level to enter the upper passage between the brushes and the upper device 25. The conveyor arms 44 and a slotted partition 60 are utilized for this purpose. The partition is secured at its lower end to the bar 50 and at its upper end to a bar 61, the curvature of the partition being such as to be engaged by the chains 39 and the latter flexed to cause the arms 44 to travel in a path which will effect the required elevation and discharge of the fruit. As the arms 44 ascend within the slots of the partition they engage and lift the pieces of fruit from the surface of the washing fluid as they are discharged from the lower passage, finally dumping the fruit onto the top of the first brush of the series to subsequently traverse the upper passage under the forward feeding movement of the brushes.

The operation of the entire machine is as follows:

With the two conveyors and a series of rotary brushes operating to move in the directions indicated by the arrows, fruit delivered to the tank through the chute 37 is immediately submerged by the first conveyor to the bottom of the tank where it soaks, softening the scale and smudge dirt while it is fed forwardly with the current of the washing fluid as created under the action of the rotating brushes 20. From the first conveyor the fruit floats into the soaking compartment and rises into contact with the brush 36 where it is brushed lightly and rinsed gently by the passing current of fluid. This removes all loose dirt and the dirt settles to the bottom of the tank away from the brush 36 as well as the brushes 20.

This is an important feature of my invention as it will be manifest that it is impossible for the loose dirt to accumulate upon the brush 36 or the brushes 20, thus prolonging the life of the brushes beyond that possible in machines where the fruit is washed preliminarily on the top of the brushes so that all dirt removed falls directly into the bristles thereby accumulating scale germs, oil, and dirt, which soon starts the fungus growth at the base of the bristles that quickly destroys them.

When the fruit reaches the end of the soaking compartment, it floats upward and is carried by the current into the lower passage between the device 26 and the brushes 20, and which passage constitutes a scrubbing compartment. Under the rotary movement of the brushes 20 the fruit is brushed forwardly through the compartment and hence scrubbed, the amount of friction between the fruit and the brushes being regulated by raising or lowering the board 26 as has been described. It is to be remembered that the action of the fingers 26$^b$ also retards the progress of the fruit through the compartment, thereby giving it a longer period of scrubbing and thus resulting in the removal of all foreign matter from the surface of the fruit. From the scrubbing compartment the fruit is lifted by the arms 44 and discharged onto the upper side of the brushes 20 where under rotative movement of the latter the fruit is conveyed through the upper passage or polishing compartment. While passing through this compartment the fruit traverses a strong solution of soap suds and under the rotative movement of the brushes the fruit is polished.

In traversing this compartment the weight of the fruit operates to maintain it in contact with the surfaces of the brushes, and any jumping action of the fruit is prevented by the fingers 25$^b$, as has been described. By an adjustment of the board 25 the amount of friction between the fruit and the brushes may be regulated and the progress of the fruit through the compartment retarded as desired.

With discharge of the fruit from the polishing compartment, it is delivered onto the platform 56 and under the action of the arms 52 of the second conveyor the fruit is finally delivered onto the board 58 as previously described. Under the action of the clean water sprayed from the pipe 59 the major portion of the soap suds is removed from the fruit leaving the latter clean and bright.

My invention is characterized by the fact that fruit is not carried through the machine by an abusive mechanical feed, but by the artificially created current of washing fluid in combination with the revolving brushes. The current of fluid acts as a cushion to the fruit and prevents it from being bruised by striking the other fruit and from being thrown against the revolving brushes and its skin punctured by the bristles. These skin punctures encourage blue mold and various types of decay. As the fruit is carried in the current of liquid it will have no tendency to roll on its smallest diameter but will present all its surfaces to the brushes, thus effecting thorough washing of both the stem and blossom ends of the fruit. As the brushes operate in soap suds at all times they are kept clean, and, consequently, their life is prolonged. The brushes constantly agitate the fluid, realizing the full benefit of the soap therein. Heretofore the soap has been placed in still soaking tanks.

Although I have herein shown and described only one form of fruit washing machine embodying my invention, it is to be understood that various changes and modifications may be made herein without departing from the spirit of the invention and the spirit and scope of the appended claims.

I claim:

1. A fruit washing machine comprising a receptacle adapted to contain a washing liquid, movable scrubbing elements having portions thereof submerged in the washing liquid and other portions above the liquid, means for actuating the scrubbing elements, means for delivering fruit beneath the scrubbing elements to have scrubbing contact successively with the submerged portions of the elements, and means for elevating the fruit and delivering it to the scrubbing elements to have scrubbing contact successively with the portions of the elements above the liquid.

2. A fruit washing machine comprising a receptacle adapted to contain a washing fluid, rotary brushes having portions thereof submerged in the washing liquid and other portions above the liquid, means beneath the brushes coacting with the latter to define a submerged passage, means above the brushes coacting with the latter to define a passage above the liquid, means for actuating the brushes so that the submerged portions thereof operate to create a circulation of the liquid substantially in one direction through said passage so that fruit delivered to the passage will be impelled therethrough by the liquid and in contact with the brushes, and means for conveying the fruit as discharged from the lower passage to the upper passage so as to have contact with those portions of the brushes above the surface of the liquid and under the impelling action of the latter to be impelled through the upper passage.

3. A fruit washing machine comprising a receptacle adapted to contain a washing liquid, a plurality of rotary brushes having portions below and above the surface of the liquid, means for delivering fruit beneath the brushes, means for actuating the brushes whereby the submerged portions thereof operate to create a forced circulation of the liquid beneath the brushes to convey the fruit successively from one brush to another, and yieldable means beneath the brushes acting to maintain the pieces of fruit in contact with the brushes.

4. A fruit washing machine comprising a receptacle adapted to contain a washing liquid, rotary brushes in the receptacle having portions disposed above and below the surface of the liquid, members above and below the brushes coacting with the latter to define, respectively a passage beneath the brushes and one above the brushes, means for actuating the brushes whereby the submerged portions operate to create a forced circulation of liquid substantially in one direction through the passage beneath the brushes, means for delivering pieces of fruit to the lower passage so as to be impelled therethrough by the brushes and liquid, means for elevating and discharging the pieces of fruit as delivered from the lower passage into the upper passage whereby the fruit will be positioned on those portions of the brushes above the surface of the liquid and under the rotative movement of the brushes impelled through said passage, and means at the discharge end of the upper passage for receiving, elevating, and discharging the fruit from the receptacle.

5. A fruit washing machine comprising a receptacle adapted to contain a washing fluid, rotary brushes positioned in the receptacle to have portions thereof submerged in the liquid, a member beneath the brushes coacting with the latter to define a passage for fruit, a brushing element at the lower side of the member, a guiding element at the entrance end of the passage, and means for actuating the brushes whereby the liquid is caused to circulate beneath the brushing element so that fruit submerged beneath said element will be impelled along the surface thereof and into engagement with said guiding element, the latter guiding the fruit into said passage for contact successively with said brushes.

6. A fruit washing machine as embodied in claim 5 wherein elevating means is positioned adjacent the discharge end of said passage for elevating the pieces of fruit and delivering the same onto those portions of the brushes above the surface of the liquid so that under rotative movement of the brushes the pieces of fruit will be caused to successively traverse the brushes, and means for maintaining the pieces of fruit against upward projection from the brushes and for retarding the feeding movement of the fruit over the brushes.

7. A fruit washing machine comprising a receptacle adapted to contain a soapy washing fluid, a plurality of horizontal brushes in the receptacle disposed to have portions thereof submerged in the fluid for conveying the suds of the fluid to the upper portions of the brushes, means for rotating the brushes so that they operate to create a circulation of the fluid substantially in one direction beneath the brushes, means for submerging fruit so as to be delivered beneath the brushes, means acting to restrain the pieces of fruit against downward movement under the action of the brushes so as to cause the fruit to successively pass from one brush to another, means for conveying the fruit from the submerged portions of the brushes to the unsubmerged portions so that they will be successively fed across the top of the brushes and thus subjected to the polishing action of the brushes and suds, and means for holding the fruit against upward projection of the brushes yet permitting forward feeding thereof.

8. A fruit washing machine comprising a receptacle adapted to contain a soapy washing fluid, horizontal rotary brushes disposed within the receptacle so as to have portions thereof submerged and to thereby rotate in the suds of the fluid, means for delivering fruit onto the brushes whereby under rotative movement of the latter they will be fed transversely across the brushes, and means common to all of the brushes for restraining the fruit from upward projection from the brushes, said means being adjustable bodily and vertically to increase or decrease the restraining action thereof with respect to the fruit.

9. A fruit washing machine comprising a receptacle adapted to contain a washing liquid, horizontal rotary brushes in the receptacle so as to have portions thereof submerged, means for delivering pieces of fruit beneath the brushes so that the buoyancy of the fruit will operate to maintain it in contact with the brushes, means for actuating the brushes to create circulation of the liquid and feed the fruit successively across the brushes, and means for yieldably urging the pieces of fruit upwardly against the brushes to increase the brushing action on the fruit and to retard movement of the fruit across the brushes, said means being adjustable vertically to vary the urging action in respect to the fruit and the retarding action in respect to feeding of the fruit.

10. A fruit washing machine comprising a receptacle adapted to contain a washing fluid, a plurality of rotary brushes disposed horizontally within the receptacle in side-by-side relation and having portions thereof submerged, and a member disposed below the brushes and having upstanding flexible fingers.

11. A fruit washing machine comprising a receptacle adapted to contain a washing fluid, a plurality of rotary brushes disposed horizontally within the receptacle in side-by-side relation and having portions thereof submerged, a member disposed below the brushes and having upstanding flexible fingers, and means for supporting the member for vertical adjustment to vary the spaced relation of the fingers with respect to the brushes.

12. A fruit washing machine comprising a receptacle adapted to contain a washing fluid, a plurality of rotary brushes disposed horizontally within the receptacle in side-by-side relation and having portions thereof submerged, a member disposed below the brushes and having upstanding flexible fingers, and a brushing element on the under side of said member.

13. A fruit washing machine comprising a receptacle adapted to contain a washing liquid, a series of rotary brushes disposed horizontally within the receptacle in side-by-side relation and having portions thereof submerged in said liquid, members above and below the brushes having on their confronting sides flexible fingers, and fruit elevating means at one end of the series of brushes for elevating pieces of fruit from beneath the brushes and discharging them onto the brushes.

14. A fruit washing machine comprising a receptacle adapted to contain a washing liquid, a series of rotary brushes disposed horizontally within the receptacle in side-by-side relation and having portions thereof submerged in said liquid, members above and below the brushes having flexible fingers on their confronting sides, said members being vertically adjustable to vary the relation of the fingers with respect to the brushes.

15. A fruit washing machine comprising a receptacle adapted to contain a washing fluid, movable brushing elements in the receptacle to have portions thereof submerged, members above and below the brushes coacting with the latter to define, respectively, a passage above and one below the brushes through which pieces of fruit are adapted to travel, and means on the members for yieldably urging the pieces of fruit into brushing contact with the brushes and to retard forward travel of the fruit through the passages.

16. A fruit washing machine comprising a receptacle adapted to contain a washing fluid, movable brushing elements in the receptacle to have portions thereof submerged, members above and below the brushes coacting with the latter to define, respectively, a passage above and one below the brushes through which pieces of fruit are adapted to travel, means on the members for yieldably urging the pieces of fruit into brushing contact with the brushes and to retard forward travel of the fruit through the passages, and mechanism for adjusting the members simultaneously and to the same degree to increase or decrease the depth of the passages to accommodate fruit of different sizes.

17. In a fruit washing machine, a plurality of rotary brushes, a member at one side of the brushes having flexible fingers thereon disposed between the member and the brushes, and means connected to the member for adjusting the latter to vary the spaced relation in respect to the brushes.

18. An apparatus for cleansing fruit or the like comprising a fruit runway formed by a series of rotatable brushes in fixed locations and positioned to form storage and treating troughs, an element located above said brushes, adjustable means for moving said element vertically toward and away from said brushes to contact with fruit in said troughs or to be out of contact therewith, which movement tends to control the passage of fruit transversely of said brushes from trough to trough.

19. An apparatus for cleansing fruit or the like comprising a fruit supporting surface made up of a series of rotatable brushes arranged in parallel relation transverse to direction of movement of material to form storage and treating runways therebetween, means located above said runways, means for imparting vertical movement to said means above said runways, said vertical adjustment permitting said means to contact with fruit in said runways, or to move it away from said brushes so that no contact whatever will be had with fruit in the runways whereby the transverse movement of fruit from trough to trough may be controlled.

20. In a machine of the class described, a tank, a rotary brush disposed in said tank and rotating on a horizontal axis, and means for maintaining fluid in said tank to a level adjacent to the lowermost portions of said brush, and means for transferring articles from below said brush to such position as to cause them to gravitate to uppermost portions of said brush.

21. In a machine of the class described, a liquid containing receptacle, a brushing runway above said liquid, an elevator extending into the liquid and positioned adjacent the receiving end of the runway, a plurality of carrier flights rigidly secured to and projecting from said elevator for engaging and lifting articles from the liquid, and means for changing the direction of movement of said elevator over a portion of its travel whereby to tilt the flights so they pass the receiving end of the runway in a tilted position so that articles carried thereby are gently rolled onto the runway.

22. A fruit washing machine comprising a receptacle adapted to contain a body of washing liquid, a plurality of rotary transverse elements and a stationary scrubbing element all submerged in the liquid the stationary element having a brushing surface on its under side and located below the rotary elements, means for moving the rotary elements to circulate the liquid to cause the submerged fruit therein to pass first beneath and in contact with the brushing surface of the stationary scrubbing element and then in contact with the rotary elements.

23. In a machine of the class described, a liquid containing tank, a brushing runway above said liquid, an elevator device partially immersed in the liquid, a plurality of carrier flights projecting from said elevator for moving articles through said liquid and delivering the said articles to the brushing runway with means along the path of movement of said elevator to deflect the said flights and cause them to tilt toward said brushing runway as they deliver articles thereto.

24. A fruit washing machine comprising a receptacle adapted to contain a washing liquid, submerged transverse rotary brushing means associated with said receptacle, another brushing means having a brushing surface on its under side and located below said rotary brushing means to form upper and lower submerged passageways through which fruit may be successively advanced, means for driving said rotary means to circulate the liquid through said passageways and propel buoyant fruit through the lower passageway beneath the lower brushing means and then into the upper passageway for engagement with the rotary brushing means.

25. A fruit washing machine comprising a receptacle adapted to contain a washing liquid, rotatable scrubbing elements having portions thereof submerged in the washing liquid so that under rotative movement of the elements the liquid is caused to circulate beneath the elements, means beneath the scrubbing elements defining a passage through which the liquid is adapted to circulate, and means for delivering fruit to said passage whereby under the movement of the liquid the fruit will be caused to have scrubbing contact successively with the submerged portions of the scrubbing elements, and a preliminary scrubbing element for contacting said fruit before it enters said passage, wherein the first mentioned means is provided with flexible fingers adapted to yield to permit movement of pieces of fruit of different sizes through said passage and to maintain the fruit in scrubbing contact with said first scrubbing elements.

LLOYD E. JONES.